US008095679B1

(12) United States Patent
Satish et al.

(10) Patent No.: US 8,095,679 B1
(45) Date of Patent: Jan. 10, 2012

(54) PREDICTIVE TRANSMISSION OF CONTENT FOR APPLICATION STREAMING AND NETWORK FILE SYSTEMS

(75) Inventors: Sourabh Satish, Fremont, CA (US); Brian Hernacki, Mountain View, CA (US); Zulfikar Ramzan, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 409 days.

(21) Appl. No.: 12/051,590

(22) Filed: Mar. 19, 2008

(51) Int. Cl.
*G06F 15/16* (2006.01)
(52) U.S. Cl. ........ 709/231; 709/213; 717/176; 717/177; 717/178
(58) Field of Classification Search .................. 709/203, 709/231, 213; 717/103, 174, 175, 176, 177, 717/178
See application file for complete search history.

(56) References Cited

U.S. PATENT DOCUMENTS

| | | | |
|---|---|---|---|
| 5,765,205 A * | 6/1998 | Breslau et al. ................. 711/203 |
| 6,530,082 B1 | 3/2003 | Del Sesto et al. |
| 6,757,894 B2 * | 6/2004 | Eylon et al. .................... 717/177 |
| 6,918,113 B2 * | 7/2005 | Patel et al. ..................... 717/178 |
| 6,959,320 B2 * | 10/2005 | Shah et al. ..................... 709/203 |
| 7,043,524 B2 * | 5/2006 | Shah et al. ..................... 709/203 |
| 7,051,315 B2 * | 5/2006 | Artzi et al. ..................... 717/103 |
| 7,062,567 B2 * | 6/2006 | Benitez et al. ................. 709/231 |
| 7,096,253 B2 * | 8/2006 | Vinson et al. ................. 709/203 |
| 7,197,570 B2 * | 3/2007 | Eylon et al. ................... 709/231 |
| 7,240,162 B2 * | 7/2007 | de Vries ........................ 711/137 |
| 7,523,191 B1 | 4/2009 | Thomas et al. |
| 7,577,751 B2 * | 8/2009 | Vinson et al. ................. 709/231 |
| 7,606,924 B2 * | 10/2009 | Raz et al. ....................... 709/231 |
| 7,735,057 B2 * | 6/2010 | Rachman et al. .............. 717/100 |
| 7,899,879 B2 * | 3/2011 | Broda ............................ 709/217 |
| 7,908,391 B1 * | 3/2011 | Satish et al. ................... 709/232 |
| 7,941,542 B2 * | 5/2011 | Broda et al. ................... 709/227 |
| 7,945,846 B2 * | 5/2011 | Beauchamp et al. .......... 715/201 |
| 2001/0034736 A1 * | 10/2001 | Eylon et al. .................... 707/200 |
| 2001/0037399 A1 * | 11/2001 | Eylon et al. .................... 709/231 |
| 2001/0044850 A1 * | 11/2001 | Raz et al. ....................... 709/231 |
| 2002/0087717 A1 | 7/2002 | Artzi et al. |
| 2002/0087963 A1 * | 7/2002 | Eylon et al. .................... 717/174 |
| 2002/0138640 A1 * | 9/2002 | Raz et al. ....................... 709/231 |
| 2003/0088511 A1 | 5/2003 | Karboulonis et al. |
| 2003/0140160 A1 * | 7/2003 | Raz et al. ....................... 709/231 |
| 2005/0188079 A1 | 8/2005 | Motsinger et al. |
| 2006/0136389 A1 * | 6/2006 | Cover et al. ....................... 707/3 |

OTHER PUBLICATIONS

Official Action received from USPTO dated Apr. 16, 2010 for U.S. Appl. No. 12/039,515, filed Feb. 28, 2008.

* cited by examiner

*Primary Examiner* — Rupal Dharia
*Assistant Examiner* — Jimmy H Tran
(74) *Attorney, Agent, or Firm* — Brill Law Office; Jeffrey Brill

(57) ABSTRACT

The performance and hence the user experience of just-in-time application streaming is significantly enhanced by predicting which sections of an application are likely to execute next, and transmitting those sections from the server to the endpoint. A control flow graph of the application is created and analyzed against the execution state of the application such that it can be predicated which code pages the application is likely to utilize next. This analysis can be performed on the server, endpoint or any combination of the two. The predicted code pages are proactively pushed and/or pulled such that the application can continue executing without delay. This significantly enhances the performance of application streaming and network file system technologies, and is especially beneficial for very performance sensitive applications.

12 Claims, 2 Drawing Sheets

… (1)

PREDICTIVE TRANSMISSION OF CONTENT FOR APPLICATION STREAMING AND NETWORK FILE SYSTEMS

TECHNICAL FIELD

This invention pertains generally to application streaming technology and network file systems, and more specifically to proactively transmitting application content to an endpoint based on a control flow graph and current application execution state.

BACKGROUND

Application streaming provides the ability for an endpoint (e.g., a client computer) to run an application locally that is stored remotely, for example on a server. The server transmits specific portions of the application (e.g., code pages) to the endpoint, as the endpoint needs them. Application streaming offers a number of advantages over running the application on the server. Streaming the application allows the application to execute locally on the endpoint, instead of remotely on the server. This eliminates the need for large farms of servers to provide applications to a plurality of client computers. Application response time to the user is also significantly faster when the application is run locally on the endpoint, as opposed to remotely on the server. Commercial application streaming technology exists today.

A network file system is a computer file system that supports sharing of resources such as files, printers and/or persistent storage over a computer network. Network file systems such as Andrew File System (AFS), NetWare Core Protocol (NCP), and Server Message Block (SMB, also known as Common Internet File System (CIFS)) exist today. Network file systems can share files, including executable files, between servers and endpoints.

An important performance measurement of a network file system is the amount of time needed to satisfy service requests. In conventional file systems, this time consists of a disk-access time and a small amount of CPU-processing time. But in a network file system, a remote access has additional overhead due to the distributed structure. This includes the time to deliver the request to a server, the time to deliver the response to the client, and for each direction, a CPU overhead of running the communication protocol software.

Both application streaming technologies and network file systems can be used to execute applications stored on a remote server on a local endpoint. However, current application streaming technologies and network file systems do not take into account what sections of a given executable file need to be pushed to the endpoint. This results in either poor performance or failure of the application. This is a particular problem for mobile users, who are often connected to the server from which the application is originating through a poor performing network, and for wireless users, whose network performance can significantly vary depending on signal strength and interference.

In many existing implementations of application streaming technologies and network file systems, an agent runs on the endpoint, monitors the execution of the application, and pulls code pages from the server when necessary. In such implementations, the agent typically leverages exceptions to obtain non-present code pages that are needed for application execution to continue. In other words, when the application running on the endpoint does not have a code page it needs, it throws an exception. Responsive to the exception, the agent pulls the needed code page from the server. The process of the application throwing exceptions and the agent responsively pulling missing code pages creates a significant performance delay. Typically, the agent caches the pages on the endpoint after they have been pulled. However, every time the application requires a non-present, non-cached code page, the exception, page pulling process is repeated. Additionally, whenever an application is updated or patched (which happens quite frequently), the agent must pull new blocks/binaries, and the application again suffers significant performance degradation.

In some implementations, there is no agent on the endpoint to monitor the application and pull required contents. Under these implementations, the server has to blindly push the application content irrespective of the execution pattern on the endpoint. This is obviously not desirable, because the application cannot execute until it has been completely pushed to the endpoint, or else the application fails intermittently when required sections are not yet available. This is often the case with existing network file systems, where the application execution is significantly delayed or slowed down till the entire application binary has been pushed to the endpoint.

It would be desirable to have application streaming technology and network file systems that do not have these problems.

SUMMARY

The performance and hence the user experience of just-in-time application streaming is significantly enhanced by predicting which sections of an application are likely to execute next, and transmitting those sections from the server to the endpoint. A control flow graph of the application is created and analyzed against the execution state of the application such that it can be predicated which code pages the application is likely to utilize next. This analysis can be performed on the server, endpoint or any combination of the two. The predicted code pages are proactively pushed and/or pulled such that the application can continue executing without delay. This significantly enhances the performance of application streaming and network file system technologies, and is especially beneficial for very performance sensitive applications.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
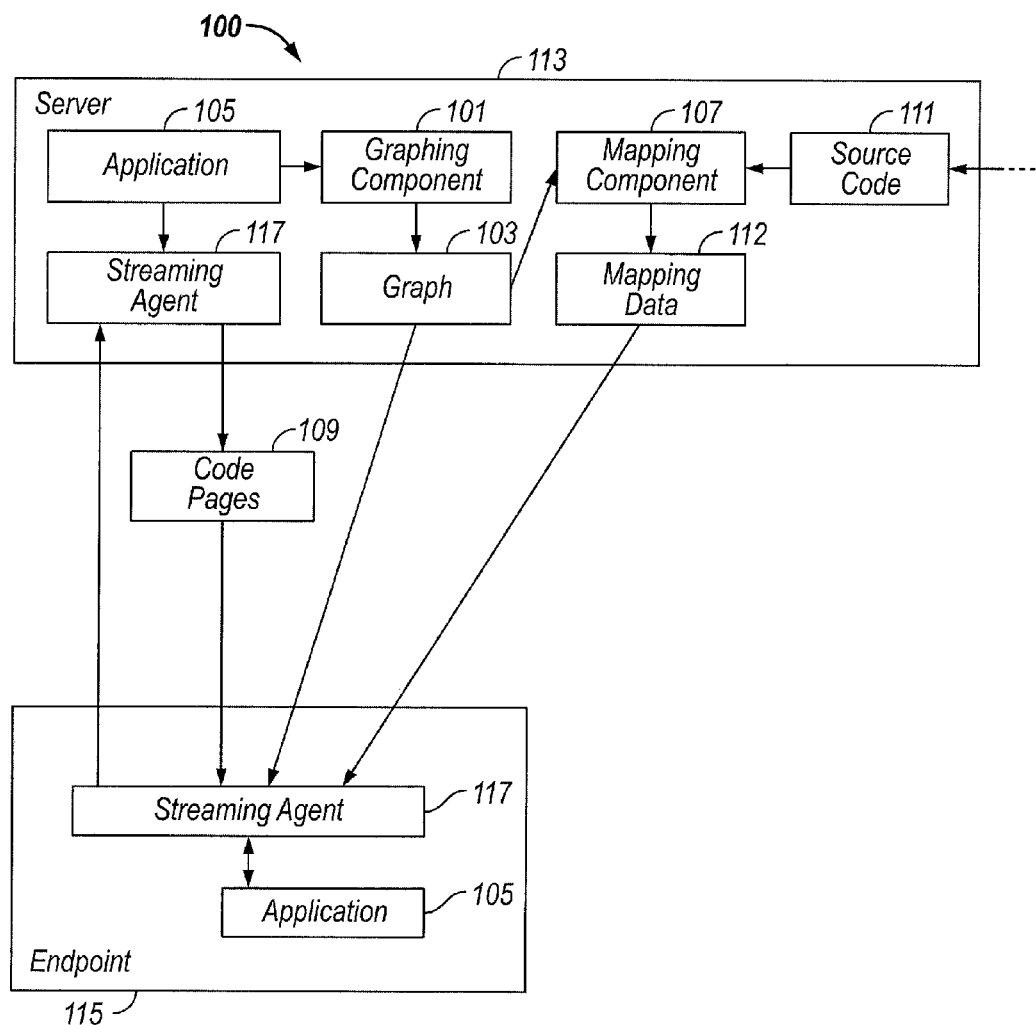
FIG. 1 is a block diagram illustrating proactively transmitting application content to an endpoint based on a control flow graph and current application execution state, according to some embodiments of the present invention.

FIG. 1 illustrates a system 100 for proactively transmitting application 105 content to an endpoint 115 based on a control flow graph 103 and current application 105 execution state, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a graphing component 101 produces a control flow graph 103 for an application 105 to be streamed. The application can comprise one or more binary images. Where the application 105 includes dependent executable images or the like (e.g., dynamically linked libraries or other late binding objects), control flow graphs 103 for these dependent binaries can also be created. The graphing component 101 can use any methodology for creating the control flow graph(s) 103. Various methodologies and tools for creating control flow graphs 103 of applications 105 are known to those of ordinary skill in the relevant art, and the use thereof within the context of the present invention will be readily apparent to those of such a skill level in light of this specification.

A mapping component 107 maps specific code pages 109 of the application 105 to nodes of the control flow graph 103. An application developer or the like provides the source code 111 for the application 105 being analyzed. The mapping component 107, by referring to the corresponding source code 111, can map specific code pages 109 back to specific program functionality, at least roughly, and hence to specific nodes of the graph 103 some embodiments, some or all of this mapping data 112 is entered by, for example, an application developer, who has access to both the source code 111 and the graph 103.

It is to be understood that how much of the mapping is performed automatically by the mapping component 107, and how much is input by, e.g., an application developer, is a variable design parameter. The implementation mechanics of performing such mapping based on the control flow graph 103 and the application source code 111 are within the skill set of one of ordinary skill in the relevant art, and the usage thereof within the context of the present invention will be readily apparent to one of such a skill level in light of this specification.

In FIG. 1, the graphing component 101 and the mapping component 107 are illustrated as running on a central server 113, which is capable of streaming applications to endpoints 115. In other embodiments, these components can run at other locations, as desired.

FIG. 1 illustrates a streaming/network file system implementation in which a streaming agent 117 runs on each target endpoint 115 and monitors local execution of application 105 execution. FIG. 1 illustrates only a single endpoint 115 for clarity, but a single server 117 can and typically does stream application 105 content to many endpoints 115. As illustrated in FIG. 1, in such implementations the control flow graph 103 and mapping data 112 are provided to the local streaming agent 117 on the endpoint 115. During the monitoring of the execution of the application 105, the streaming agent 117 analyzes the control flow graph 103 and mapping data 112 to determine which code pages 109 are likely to execute next, based on the application's 105 current execution state. The streaming agent 117 pulls the predicted code pages 109 from the streaming server 113 before they are needed, such that the application 105 can continue running without having to throw an exception due to a missing code page 109. The streaming agent 117 can very effectively use the control flow graph 103 and mapping data 112 to determine what code pages 109 should be pulled depending on what branch of code is currently executing, such that the application 105 always has the necessary code pages 109.

Figure 2:
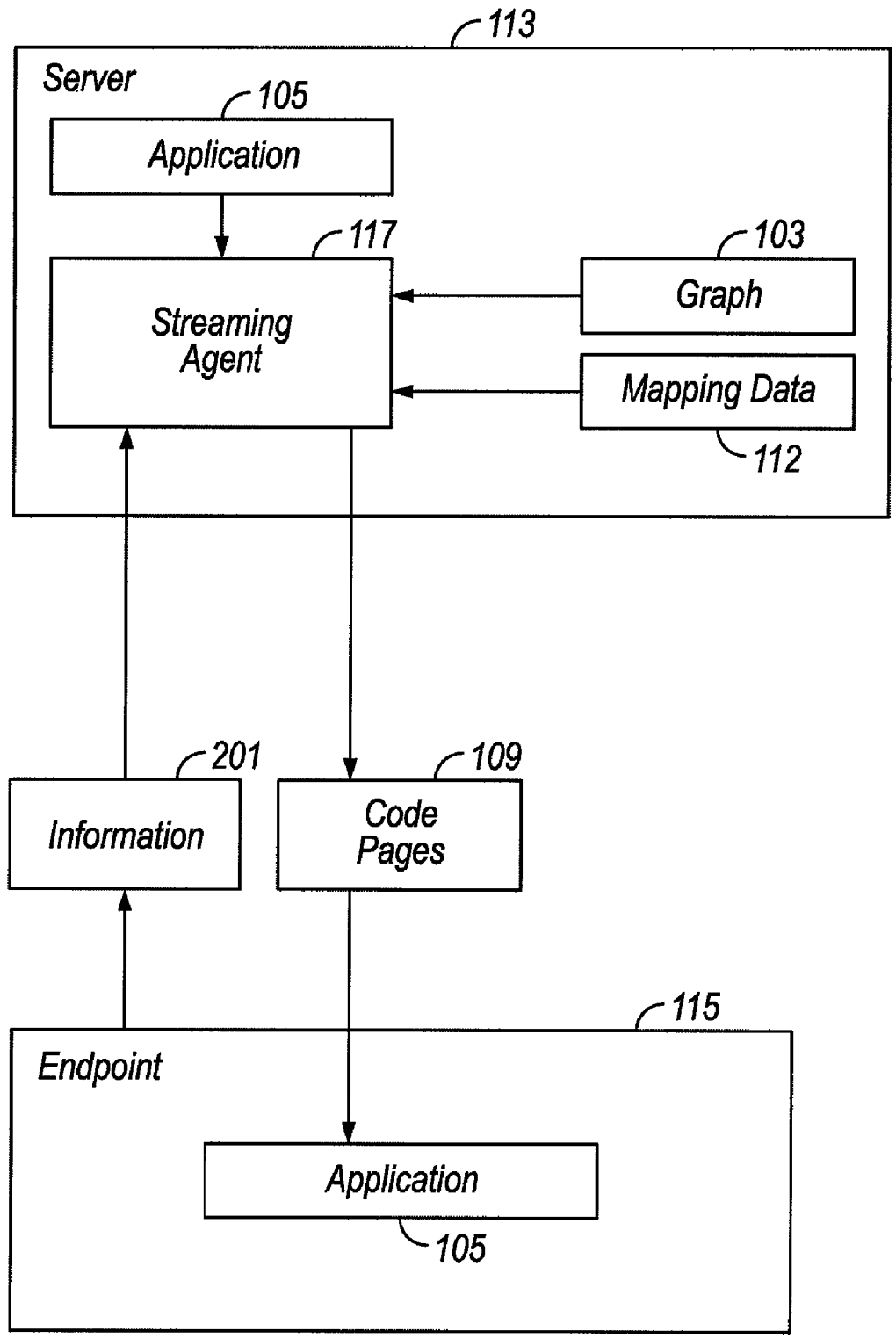
FIG. 2 is a block diagram illustrating proactively transmitting application content to an endpoint based on a control flow graph and current application execution state, according to other embodiments of the present invention.

FIG. 2 illustrates an embodiment of the present invention for use in application streaming/network file system implementations in which there is no streaming agent 117 running on the endpoint 115. Absent the present invention, in such implementations the server 113 simply pushes the application 105 to the endpoint 115 irrespective of the execution context. In the embodiment of the present invention illustrated in FIG. 2, a streaming agent 117 running on the server 113 gleans information 201 concerning the state of application 105 execution from the communication from the endpoint 115. More specifically, the communication protocol used for transmissions between the server 113 and endpoint 115 can be adjusted so that communication originating from the endpoint 115 (e.g., acknowledgements of received packets) includes some type of information 201 indicative of the execution status of the application 105. Based upon the current execution state of the application 105, the server 113 can utilize the control flow graph 103 and mapping data 112 to determine which code pages 109 are likely to execute next. The server 113 pushes those code pages 112 to the endpoint 115 instead of blindly pushing the entire binary and its dependent binaries. The implementation mechanics for modifying communication protocols are known to those of ordinary skill in the relevant art (e.g., modification of a protocol stack, filtering/intercepting relevant system calls, etc.). The usage thereof within the context of the present invention will be readily apparent to one of ordinary skill in the relevant art in light of this specification.

It is to be understood that the analysis concerning which code pages 109 to push/pull based on the application's 105 execution state, control flow graph 103 and mapping data 112 can also be distributed as desired between the server 113 and endpoint 115. For example, a streaming agent 117 on the endpoint 115 could make requests for specific code pages 109 based on the control flow graph 103 and mapping data 112, and a streaming agent 117 on the server 113 could use those requests, the control flow graph 103 and the mapping data 112 to predict what code pages 109 would be requested next. The server 113 could either send the predicted code pages 109 to the endpoint 115 proactively, or load them for sending in anticipation of the predicted requests. This is only one example of distributed predictive analysis. How much of the analysis to instantiate on which computing device is a variable design parameter that can be adjusted as desired.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for proactively pulling non-present application content from a server for execution on an endpoint, the method comprising the steps of:
   receiving at least one code page of an application from the server by the endpoint, for execution of the application on the endpoint;
   receiving a control flow graph concerning the application from the server by the endpoint;
   receiving a mapping of code pages of the application to nodes of the control flow graph from the server by the endpoint;
   monitoring execution of the application on the endpoint;
   identifying at least one non-present code page of the application to be subsequently executed, based on a current execution state of the application, the control flow graph concerning the application and the mapping of code pages of the application to nodes of the control flow graph wherein the identifying the at least one non-present code page of the application to be subsequently executed, based on the current execution state of the application, the control flow graph concerning the application and the mapping of code pages of the application to nodes of the control flow graph further comprises 1) determining at least one likely path of subsequent execution for the application based upon the current execution state of the application and the control flow graph, and 2) identifying at least one non-present code page mapped to at least node of the control flow graph pertaining to the at least one likely path of subsequent execution;
   requesting said at least one non-present code page of the application from the server, based on the current execution state of the application, the control flow graph concerning the application and the mapping of code pages of the application to nodes of the flow graph; and
   receiving said at least one non-present code page of the application from the server, responsive to said request.

2. The method of claim 1 wherein monitoring execution of the application on the endpoint further comprises:
   determining a current point of execution of the application.

3. The method of claim 1 further comprising:
   executing at least one received code page of the application.

4. The method of claim 1 further comprising:
   receiving at least one additional non-requested code page of the application from the server.

5. A computer implemented method for proactively pushing application content from a server for execution on an endpoint, the method comprising the steps of:
   creating a control flow graph concerning an application;
   creating a mapping of code pages of the application to nodes of the control flow graph;
   transmitting at least one code page of the application from the server to the endpoint, for execution of the application on the endpoint;
   receiving a current execution state of the application from the endpoint, the current execution state embedded as modified data in a communication protocol used to communicate between the server and the endpoint;
   identifying at least one code page of the application not present on the endpoint to be subsequently executed, based on the current execution state of the application, the control flow graph concerning the application and the mapping of code pages of the application to nodes of the control flow graph, wherein the identifying the at least one code page of the application not present on the endpoint to be subsequently executed, based on the current execution state of the application, the control flow graph concerning the application and the mapping of code pages of the application to nodes of the control flow graph further comprises 1) determining at least one likely path of subsequent execution for the application based upon the current execution state of the application and the control flow graph, and 2) identifying at least one code page mapped to at least one node of the control flow graph pertaining to the at least one likely path of subsequent execution, said at least one code page not being present on the endpoint; and
   transmitting said at least one identified code page of the application from the server to the endpoint.

6. The method of claim 5 further comprising:
   receiving at least one request for a specific code page of the application from the endpoint.

7. At least one non-transitory computer readable storage medium storing a computer program product for proactively pulling non-present application content from a server for execution on an endpoint, the computer program product storing program code that when executed by a processor performs a method comprising:
   receiving at least one code page of an application from the server by the endpoint, for execution of the application on the endpoint;
   receiving a control flow graph concerning the application from the server by the endpoint;
   receiving a mapping of code pages of the application to nodes of the control flow graph from the server by the endpoint;
   monitoring execution of the application on the endpoint;
   identifying at least one non-present code page of the application to be subsequently executed, based on a current execution state of the application, the control flow graph concerning the application and the mapping of code pages of the application to nodes of the control flow graph wherein the identifying the at least one non-present code page of the application to be subsequently executed, based on the current execution state of the application, the control flow graph concerning the application and the mapping of code pages of the application to nodes of the control flow graph further comprises 1) determining at least one likely path of subsequent execution for the application based upon the current execution state of the application and the control flow graph, and 2) identifying at least one non-present code page mapped to at least node of the control flow graph pertaining to the at least one likely path of subsequent execution;

requesting said at least one non-present code page of the application from the server, based on the current execution state of the application, the control flow graph concerning the application and the mapping of code pages of the application to nodes of the flow graph; and receiving said at least one non-present code page of the application from the server, responsive to said request.

8. The computer program product of claim 7 wherein the monitoring execution of the application on the endpoint, wherein the method further comprises:

determining a current point of execution of the application.

9. The computer program product of claim 7 further comprising:

executing at least one received code page of the application.

10. The computer program product of claim 7, wherein the method further comprises:

receiving at least one additional non-requested code page of the application from the server.

11. At least one non-transitory computer readable storage medium storing a computer program product for proactively pushing application content from a server for execution on an endpoint, the computer program product storing program code that when executed by a processor performs a method comprising:

creating a control flow graph concerning an application;

creating a mapping of code pages of the application to nodes of the control flow graph;

transmitting at least one code page of the application from the server to the endpoint, for execution of the application on the endpoint;

receiving a current execution state of the application from the endpoint, the current execution state embedded as modified data in a communication protocol used to communicate between the server and the endpoint;

identifying at least one code page of the application not present on the endpoint to be subsequently executed, based on the current execution state of the application, the control flow graph concerning the application and the mapping of code pages of the application to nodes of the control flow graph, wherein the identifying the at least one code page of the application not present on the endpoint to be subsequently executed, based on the current execution state of the application, the control flow graph concerning the application and the mapping of code pages of the application to nodes of the control flow graph further comprises 1) determining at least one likely path of subsequent execution for the application based upon the current execution state of the application and the control flow graph, and 2) identifying at least one code page mapped to at least one node of the control flow graph pertaining to the at least one likely path of subsequent execution, said at least one code page not being present on the endpoint; and transmitting said at least one identified code page of the application from the server to the endpoint.

12. The computer program product of claim 11, wherein the method further comprises:

receiving at least one request for a specific code page of the application from the endpoint.

\* \* \* \* \*

UNITED STATES PATENT AND TRADEMARK OFFICE
CERTIFICATE OF CORRECTION

| | | |
|---|---|---|
| PATENT NO. | : 8,095,679 B1 | |
| APPLICATION NO. | : 12/051590 | |
| DATED | : January 10, 2012 | |
| INVENTOR(S) | : Sourabh Satish, Brian Hernacki and Zulfikar Ramzan | |

It is certified that error appears in the above-identified patent and that said Letters Patent is hereby corrected as shown below:

Col. 3, line 41, replace "graph 103 some embodiments" with "graph 103. In some embodiments"

Col. 5, line 56, replace "at least node" with "at least one node"

Col. 7, line 7, replace "at least node" with "at least one node"

Signed and Sealed this
Thirteenth Day of March, 2012

David J. Kappos
*Director of the United States Patent and Trademark Office*